O. C. THOMPSON.
MACHINE FOR USE IN MAKING BOXES.
APPLICATION FILED FEB. 25, 1920.

1,438,932.

Patented Dec. 12, 1922.
7 SHEETS—SHEET 2.

Inventor
Osceola C. Thompson.
By his Attorney
Edward Dunn Jr.

O. C. THOMPSON.
MACHINE FOR USE IN MAKING BOXES.
APPLICATION FILED FEB. 25, 1920.
1,438,932. Patented Dec. 12, 1922.
7 SHEETS—SHEET 6.
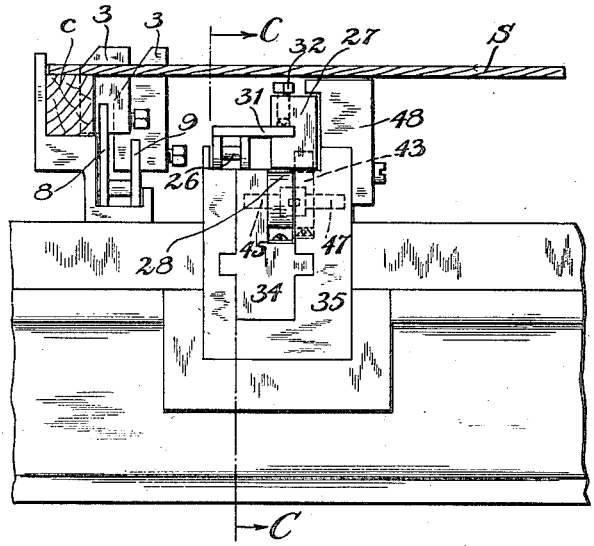
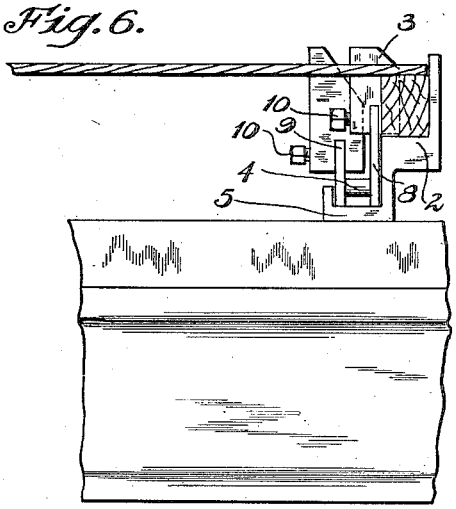
Fig. 6.
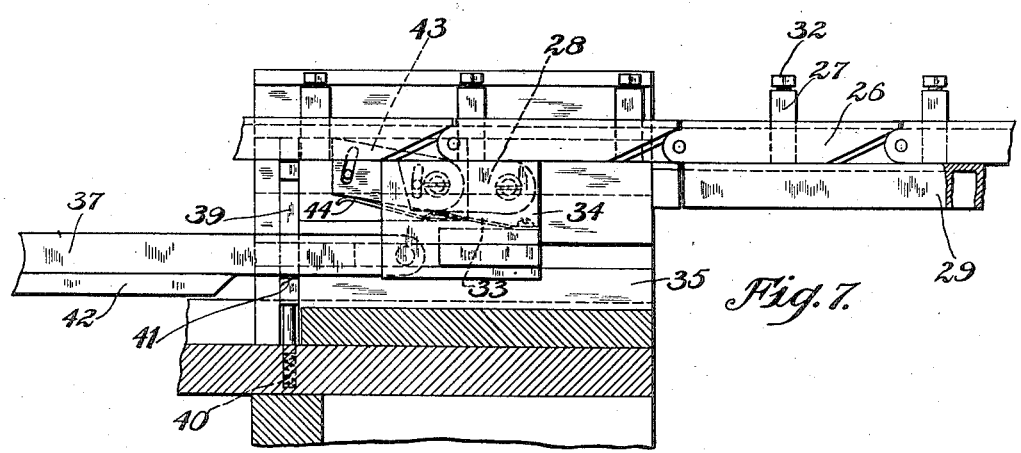
Fig. 7.
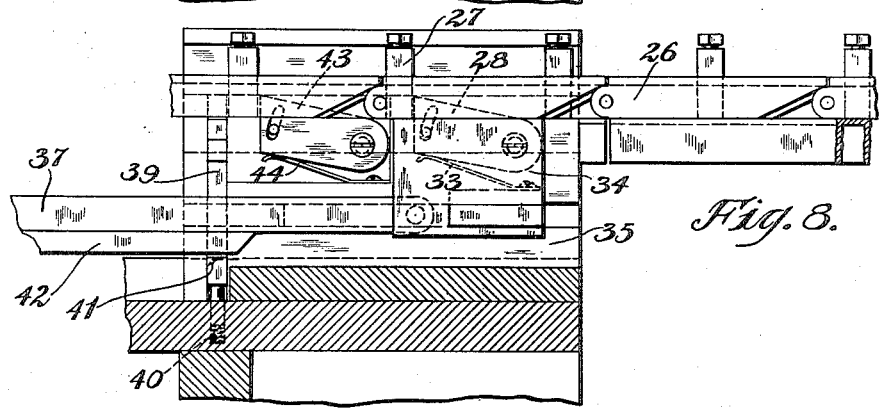
Fig. 8.
INVENTOR
Osceola C. Thompson.
BY Edward Dunne Jr
his ATTORNEY Patented Dec. 12, 1922.

1,438,932

UNITED STATES PATENT OFFICE.

OSCEOLA C. THOMPSON, OF WHITE PLAINS, NEW YORK, ASSIGNOR TO WIREBOUNDS PATENTS COMPANY, A CORPORATION OF MAINE.

MACHINE FOR USE IN MAKING BOXES.

Application filed February 25, 1920. Serial No. 361,104.

*To all whom it may concern:*

Be it known that I, OSCEOLA C. THOMPSON, a citizen of the United States, residing at White Plains, in the county of Westchester, in the State of New York, have invented new and useful Improvements in Machines for Use in Making Boxes, of which the following is a specification.

This invention relates to machines for use in making boxes, crates, blanks and the like and particularly to machines for use in making wirebound boxes, crates, blanks and parts thereof.

Among other objects the invention is intended to provide improved mechanism for feeding box materials and for positioning the staples or fasteners by which the box materials are secured together and the binding wires attached thereto.

The invention will be described by reference to an illustrative embodiment shown in the accompanying drawings in which:—

Fig. 6 is an enlarged end view of the feed chain and the two conveyor chains with materials for a blank thereon.

Figs. 7, 8 and 9 are diagramatic sectional views taken on line C—C of Fig. 6 showing in detail the operation of the feed pawl and locking mechanisms.

Figure 1:
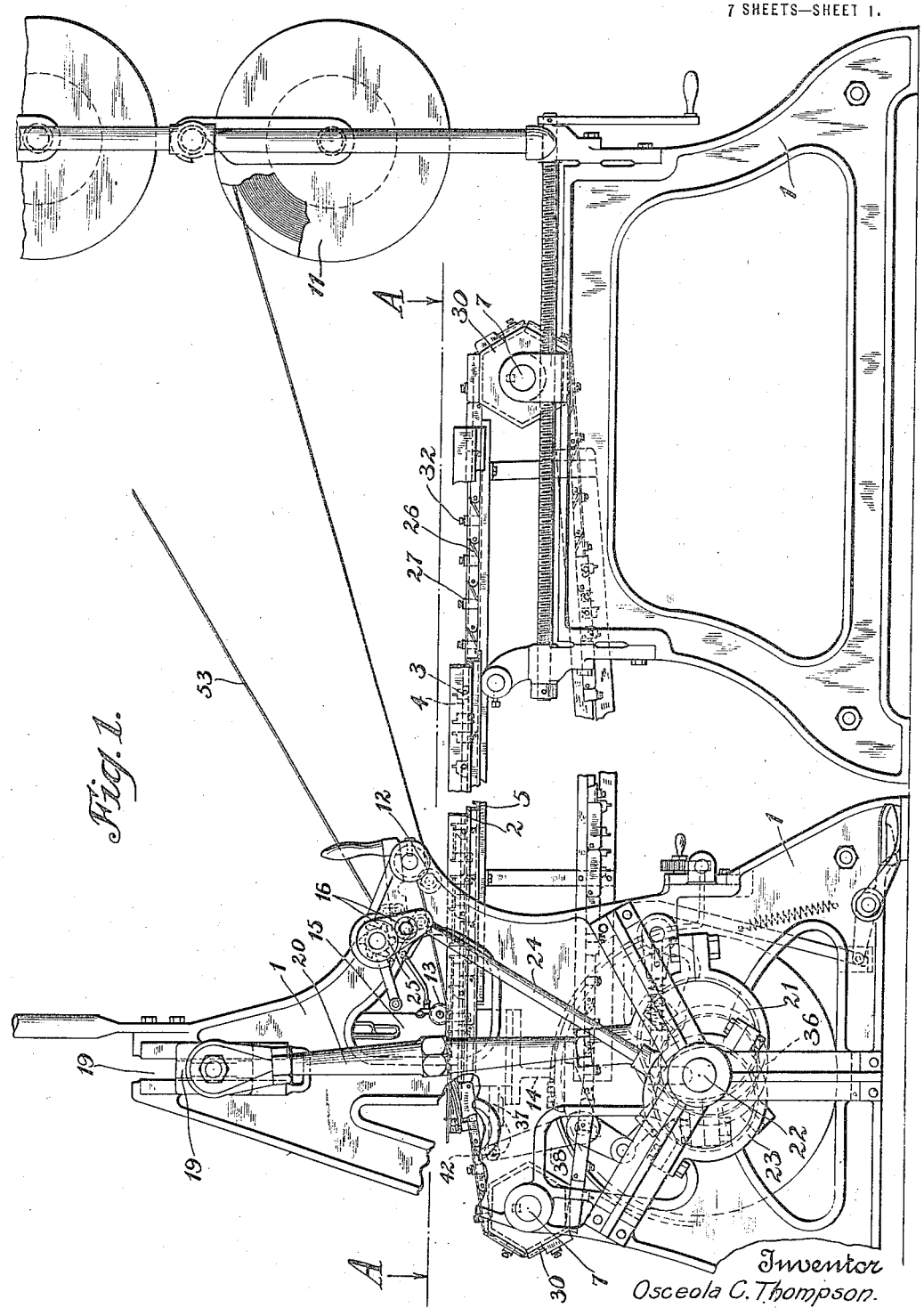
Fig. 1 is a side elevation of a box blank machine with portions broken away for clearness of illustration.

The illustrative machine consists generally of a gang of binding wire applying and stapling mechanisms for wiring together box parts on a work support, said mechanisms and the work being relatively movable for stapling the wires at intervals depending upon the progression of the work between successive operations of the staplers.

In the illustrative machine, the staplers and associated mechanisms are relatively stationary in the side frames 1 and the work is supported by the guides 2 and advanced along said guides by spacer blocks 3 adjustably secured, at intervals, to conveyor chains 4 running on channel-shaped supporting rails 5 and trained around sprocket wheels 6 keyed to shafts 7 at either end of the machine. Conveyor chains 4 may consist of individual links suitably connected together. The guide 2 and conveyor chain 4 on one side of the machine are adjustable laterally so as to provide for the making of different sized boxes, as is well known to those skilled in the art.

The conveyor chains 4 which run adjacent each guide 2 are provided with flanges 8 and 9 to which are adjustably secured the spacer blocks 3 for spacing and advancing the materials for box sections. Flange 8 which lies adjacent the guide carries spacer blocks which extend over onto the guide 2 and space and advance the cleats C and side material S of box sections. Flange 9 is adapted to carry crate spacer blocks for spacing and advancing slatted side material for a crate. Said spacers are appropriately formed to provide the desired spacing and are adjustably secured, at proper intervals, to the flanges of conveyor chains 4 by means of set screws 10 or in any other suitable manner.

Conveyor chains 4 may be of a length to carry spacers for a single unit of work or box blank or for a series of units of work or box blanks and to accomodate materials for different sized boxes, said chains may be lengthened by inserting additional links or shortened by removing some of the links and adjusting shaft 7 at the receiving end of the machine which is adjustable toward and from the other shaft 7 as best shown in Fig. 1.

Cleats C and superposed sheets S of side material composing box sections are assembled on the guides 2 between the spacers 3 and are thus positioned in proper relationship to provide a box blank or blanks. As the work progresses beneath the staplers, a plurality of continuous binding wires are drawn from suitable supply reels 11 and introduced in proper relation to the box sections to be stapled thereto, the wires being led between the rollers 12 and advanced under the rollers 13 at the feet of the stapler bodies and being pulled along with the work by virtue of their attachment thereto at preceding points. Certain of the wires aligned with the box cleats are stapled through the sheets thereto so as to connect such wires to both the sheets and cleats and secure the latter together; and intermediate wires are or may be stapled to the sheets and clinched on their under side by co-action of the staple drivers with anvils, not shown, supported on the cross frame member 14.

The illustrated staplers 15 are of the type disclosed in the patent to Thompson No. 1,258,625 dated March 5, 1918, comprising staple formers and drivers adapted at every operation to cut and form staples from staple stock wire fed thereto by rollers 16 and to drive the same over the binding wires into the work. Said staplers are mounted on the stationary cross head 17 and actuated by the vertically reciprocating cross head 18 working in guides 19 of the side frames 1 and operated by pitman 20 from eccentric 21 on the main shaft 22, there being a similar operating connection at either side of the machine. The rollers 16 for the staple stock wire are also operated from the main shaft by eccentric 23 and connecting rod 24 working a pawl and ratchet device 25 for rotating the rollers intermittently.

It will be understood that a staple is formed and driven at every reciprocation of the cross head 18, the staple being driven on the downward stroke while the material is momentarily at rest, the extent of movement of the material between successive operations of the staplers determining the spacing between successive staples.

Step-by-step movement is imparted to the conveyor chains 4 by a regulable feed mechanism, the movements being automatically controlled for positioning staples in desired relation on the work.

Such feed mechanism comprises an adjustable pattern of feed members having a fixed ratio of movement with the work forwarding means and a motion imparting device adapted to successively engage and advance said feed members.

In the illustrative machine the pattern of feed members is typified by a series of lugs 27 adjustably secured at intervals to a feed chain 26 having connection with the conveyor chains 4 and correlated in movement therewith, and the motion-imparting device for successively engaging and advancing the lugs 27 is typified by the constantly reciprocating spring pressed feed pawl 28 adapted to engage each lug in turn and advance it to the end of the drive stroke of the feed pawl.

As illustrated, feed chain 26, preferably comprising individual chain links and running in supporting channel 29, is preferably located adjacent the conveyor chain 4 which is not adapted for lateral adjustment and is trained around sprocket wheels 30, also keyed to at least one of the shafts 7 at either end of the machine. Thus, feed chain 26 having connection with conveyor chains 4 will move therewith, and movement of feed chain 26 will impart movement to conveyor chains 4 and the work.

While, for illustration, feed chain 26 is preferably shown as of a length equal to the conveyor chains 4 and adapted to move synchronously therewith, it will be understood that the feed chain may be otherwise constructed and arranged to provide a fixed ratio of movement between the feed chain and the conveyor chains so that movements of the feed chain will be uniformly correlated with the movements of the conveyor chains, and movement of the feed chain a certain distance will cause movement of the conveyor chains a certain distance, thus enabling definite control of the movements of the conveyor chains by controlling the movements of the feed chain.

For controlling the movements of the work, therefore, lugs 27 which may be adjustably secured to a flange 31 on the chain 26 by set screws 32, are located at points along said feed chain corresponding relatively to desired stapling points on the work and upon successive reciprocations of feed pawl 28, each lug will be advanced in turn to the same point relative to the stapling plane, thus advancing its corresponding staple receiving point on the work to staple receiving position. As best shown in Figs. 5, 6, 7, 8 and 9, feed pawl 28 is located directly beneath the path of travel of lugs 27 and is yieldingly held against said lugs by spring 33 so that upon movement to the right in said figures, feed pawl 28 passes under a lug and snaps in behind it in position to propulsively engage the lug upon the return or drive stroke of the feed pawl. If the lugs 27 are spaced apart distances equal to the maximum throw of the feed pawl, maximum feed steps of the work will result. If, however, the distances between lugs are reduced, the resulting feed steps of the work will be correspondingly reduced. If said lugs are irregularly spaced, the feed pawl will engage each of said lugs in succession at different points in its effective travel to the left in Fig. 5, depending upon the distance between said lugs, and advance each lug a distance equal to the distance between the engaged lug and its predecessor. Thus it will be noted that the movements of feed chain 26 are controlled by the location of the lugs 27 thereon, and that the distance between said lugs determines the extent of the step movements of the work.

It will also be noted that the feed chain 26, which is adjustable in length, and its detachable lugs 27, which may be selectively spaced thereon, constitute an adjustable, flexible ratchet having adjustable teeth, and that the lugs 27 on the feed chain constitute a pattern for the location of staples in a unit of work or a box blank or in a series of units of work or box blanks and will automatically operate repeatedly to control the location of staples in succeeding units or blanks or in succeeding series of units or blanks according to said pattern.

Figure 3:
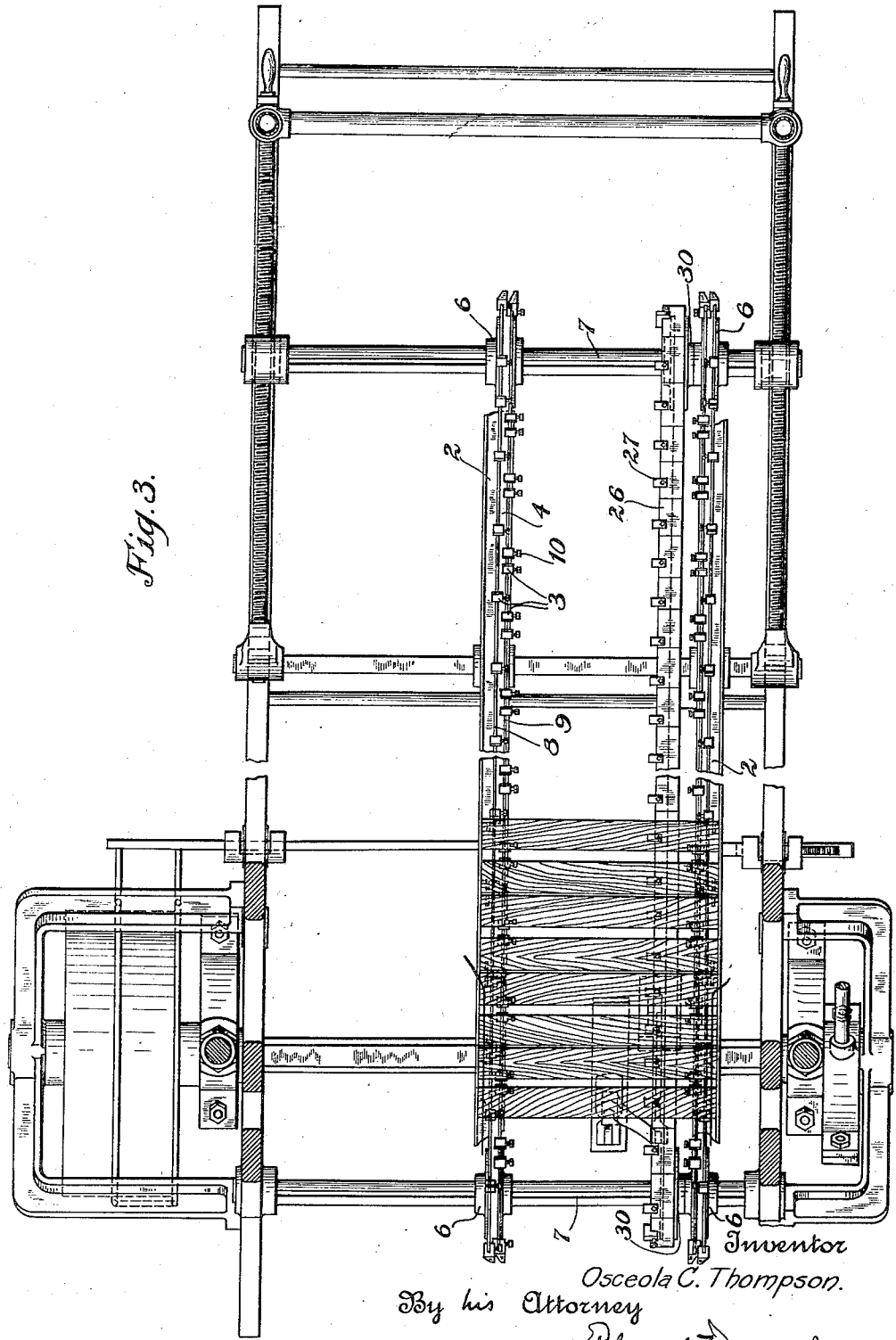
Fig. 3 is a plan view taken on the line A—A of Fig. 1 and showing slatted side material for a crate blank being operated upon.
Figure 4:
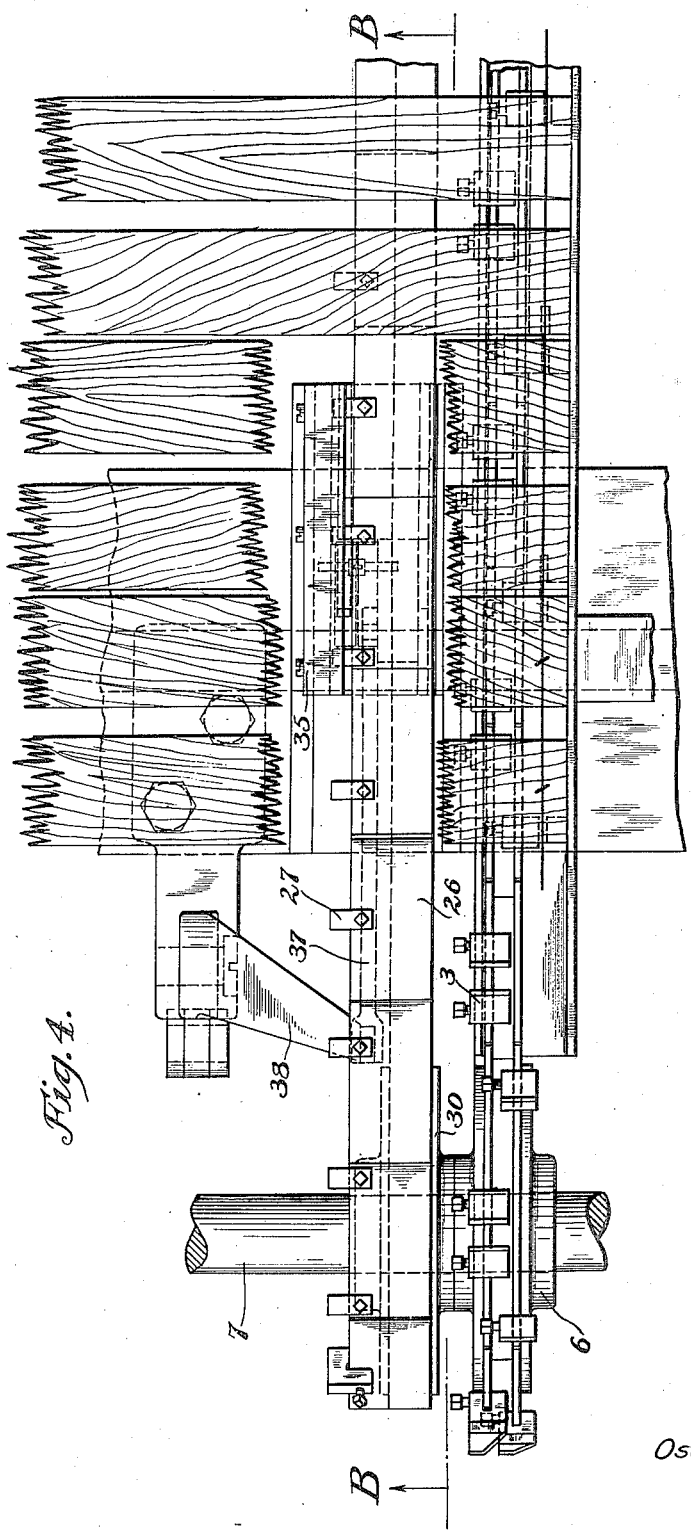
Fig. 4 is an enlarged plan view of a portion of the feed chain and one of the conveyor chains with blank materials thereon.
Figure 5:
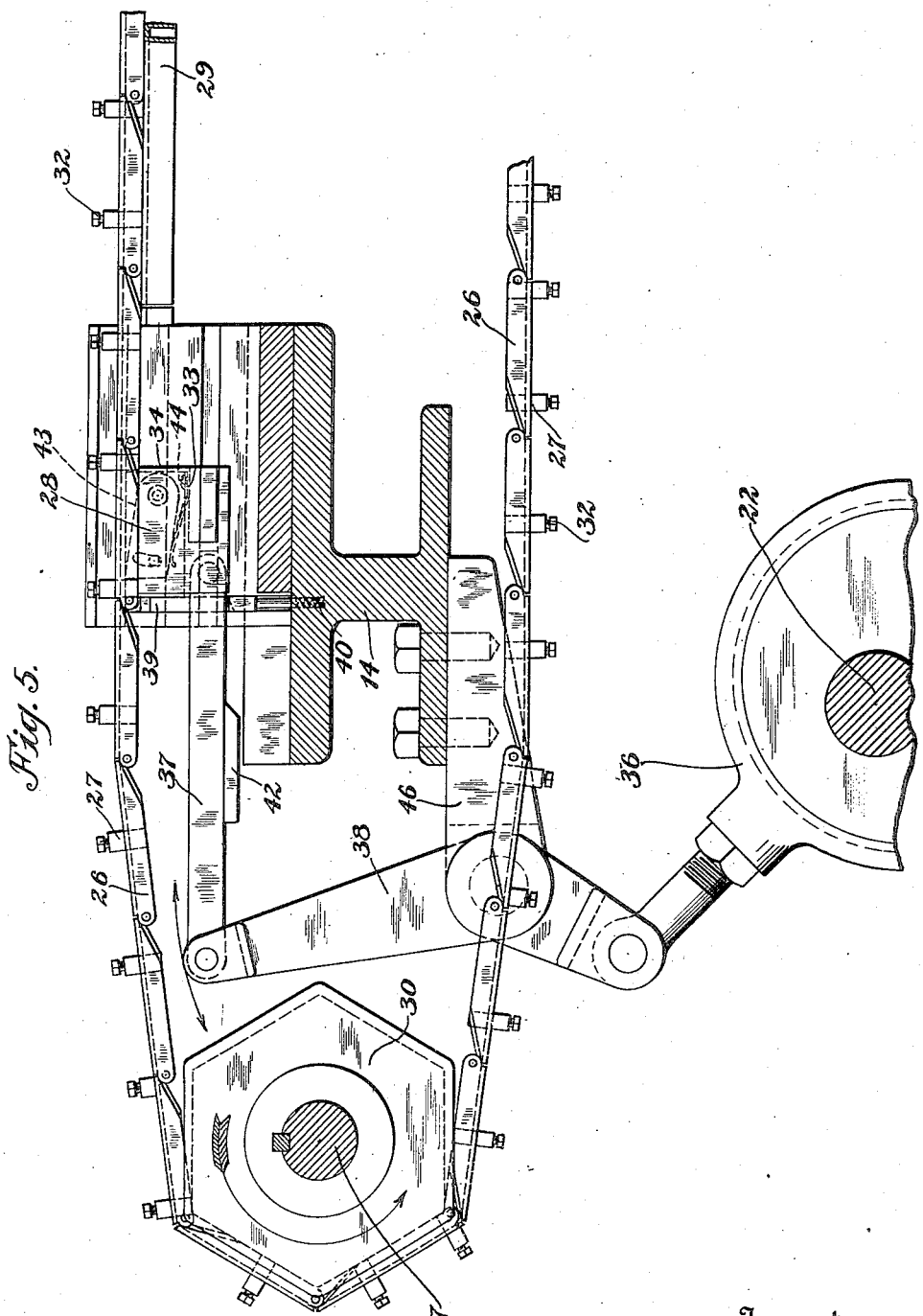
Fig. 5 is a section on line B—B of Fig. 4, showing only the feed chain and operating mechanism therefor.

It will be further noted that in the specific machine illustrated in which the feed chain 26, as heretofore stated, is preferably shown as of the same length as the conveyor chains 4 and adapted to move synchronously therewith, the feed pawl 28 is preferably so adjusted as to advance each lug in turn to the stapling plane, thus locating or positioning a staple in the work opposite each lug on the feed chain. This is particularly advantageous in that the operator may determine the points on a box blank or box part where he desires staples to be driven, and then locate one of the lugs opposite each of said points as clearly shown in Figs. 3 and 4.

To maintain the fixed ratio of movement between the feed chain and the conveyor chains, when the length of the conveyor chains is adjusted, the individual links of the feed chain may be of such size relative to the size of the individual links of the conveyor chains that an equal number of links may be removed from or added to the feed chain and each of the conveyor chains without varying the ratio of movement therebetween.

Feed pawl 28 is pivotally mounted by means of a screw 45 on carriage 34 which is adapted to reciprocate in a channel formed by casing 35 supported by cross frame member 14.

Carriage 34 is reciprocated constantly from eccentric 36 on main shaft 22 through connecting rod 37 and bell crank lever 38, mounted on bracket 46 extending from cross frame member 14, said parts being properly adjusted to provide sufficient throw of the feed pawl to produce a maximum feed step.

Figure 9:
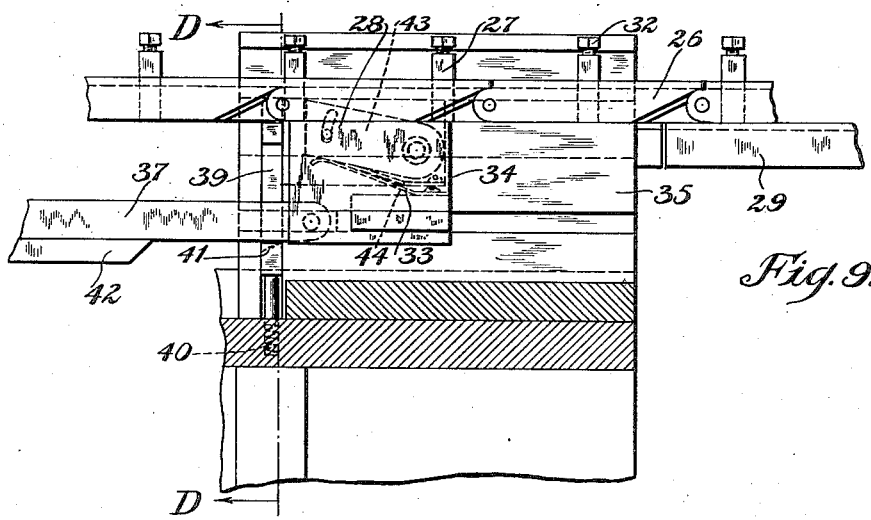
Figure 10:
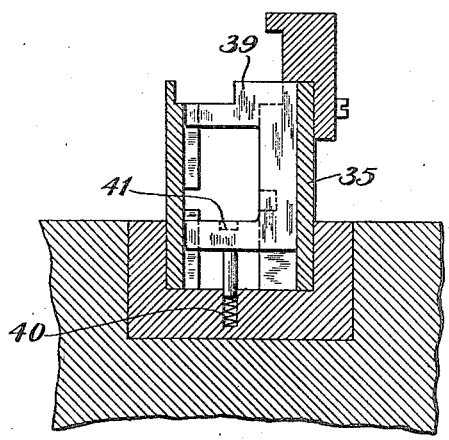
Fig. 10 is a section on line D—D of Fig. 9 showing the stop mechanism for preventing overthrow of the feed and conveyor chains.

It is desirable to provide mechanism to prevent possible overthrow of the conveyor chains 4 at the termination of a feed step so as to insure the definite location of each staple where desired. Such mechanism may comprise a vertically reciprocating stop 39 slidably mounted in casing 35 and normally held in the path of travel of lugs 27 by means of a spring 40; and means for withdrawing and withholding the stop from its effective position during each drive stroke of the feed pawl. As shown in Figs. 9 and 10, stop 39 is so formed as to permit connecting rod 37 to pass through it directly above its base, which is provided with a bevelled surface 41. For withdrawing the stop 39 from its operative position, connecting rod 37 is provided with a cam surface 42 adapted upon movement of connecting rod 37 to the right in Fig. 9 to engage bevelled surface 41 of stop 39 and lower it against the action of spring 40. Thus, as best shown in Figs. 7, 8 and 9, when feed pawl 28, after it has finished a drive stroke, reciprocates to the right to engage the next lug, cam surface 42 on connecting rod 37 will engage bevelled surface 41 of stop 39 and lower the stop out of the path of travel of the lugs 27 and will hold said stop in inoperative position until cam surface 42 on its return movement to the left, releases the stop, permitting it to snap up into position to lock the oncoming lug at the termination of its feed step.

Mechanism is also provided to prevent backward throw of the chains at the termination of a feed step. Such mechanism may comprise a spring pressed pawl 43 pivotally mounted on the casing 35 by screw 47 directly between the path of travel of the lugs 27 and adapted to snap in behind each lug 27 at the end of its feed step. Said pawl is yieldingly held against the lugs 27 by spring 44 and is so formed and adjusted as to permit the lugs 27 to pass over the pawl 43 when the lugs are being fed by the feed pawl 28, but locking each lug against a rebound or backward throw immediately after the termination of its feed movement.

As best shown in Fig. 6, a guard rail 48, formed to extend over lugs 27 as they pass, is secured to casing 35 adjacent the path of travel of lugs 27 to assist in bracing said lugs against the impact of the feed pawl and to relieve possible strain on the flange 31 of feed chain 26.

In operating the illustrative machine the operator locates the spacer blocks 3 on the conveyor chains 4 at proper intervals for spacing the cleats and sheets of a box blank or blanks. He then determines by eye or otherwise the desired locations of staples in each blank and secures his pattern of lugs 27 to feed chain 26, relatively locating said lugs according to the relative locations of selected fastener-receiving points on the work. If the spaces between box blanks on the conveyor chains are greater than a maximum feed step, additional lugs may be secured to the feed chain to produce the necessary feed steps to advance such spaces. The machine may then be started and will operate continuously on successive box blanks, the pattern of controlling members automatically locating staples according to said pattern without adjustment, the stop 39 preventing any overthrow and the pawl 43 preventing any rebound of the work at the termination of feed steps.

The operations of the feed pawl 27, the stop 39 and the pawl 43 are clearly illustrated in Figs. 7, 8 and 9. In Fig. 7 the work is at rest and feed pawl 28 is moving to the right to engage the next lug 27, while the stop 39 and pawl 43 are in operative position, locking the feed chain against movement forward or backward. As feed pawl and connecting rod 37 continue to move to the right, cam surface 42 engages bevelled surface 41 of stop 39, and lowers the stop out of the path of travel of the lugs 27, and feed pawl 28 snaps in behind the next lug 27, assuming the positions shown in Fig. 8. Feed pawl 28 then starts its drive stroke, advancing the lug it has just engaged to the position shown in Fig. 9, where it is locked between the stop 39, which has been released during the drive stroke, and the pawl 43 which was depressed by lug 27 during its movement, but which has snapped in behind the lug as it came to rest against the stop 39.

Figure 2:
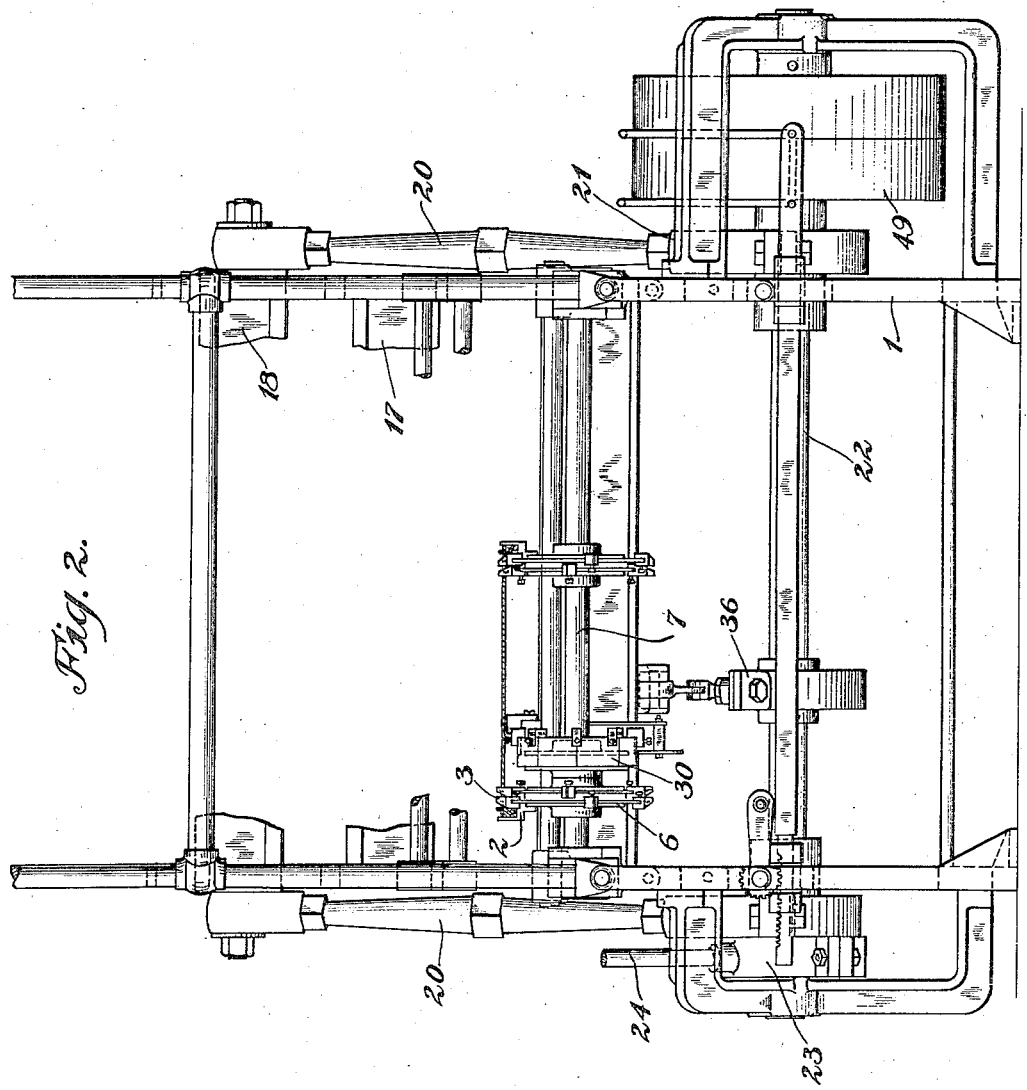
Fig. 2 is an end elevation of the machine viewed from the right in Fig. 1.

Power for operating the machine may be applied in any suitable manner, as, for instance, by power pulley 49, shown in Fig. 2, which may be controllably clutched to the shaft 22 by any suitable clutch mechanism.

It will be noted that in the illustrative machine each lug 27 will be advanced to the stapling plane in succession and the staples will be driven into the work at points corresponding to the location of lugs 27 on the chain 26; that said lugs which have connection with the work forwarding means are directly and successively engaged by a actuator which is typified by the feed pawl 28 and advanced to the stapling plane. Thus a simple and effective mechanism for feeding box materials and locating staples where desired thereon is provided.

It will also be noted that the lugs 27 which control the feed steps are also a part of the feeding mechanism. This is particularly advantageous in that it obviates the necessity of providing independent controlling means for the feeding mechanism.

While, as shown herein for illustration, the lugs 27 are carried by a feed chain having connection with the work-forwarding means typified by the conveyor chains, it will be obvious that said lugs might be secured to the conveyor chains themselves or otherwise connected to the work-forwarding means without departing from the invention.

It will also be understood that the particular construction of work-forwarding means illustrated may be variously modified without departing from the invention; for instance, a conveyor of the carriage type, upon which the box materials are carried, might be employed in place of the stationary guides or channels and pusher chains here shown.

Obviously the present invention is not limited to the particular embodiment shown and described, but may be variously embodied and the particular construction shown may be variously modified, as will appear to those skilled in the art. Furthermore it is not indispensable that all the features of the invention be used conjointly, since they may be used to advantage in various different combinations and sub-combinations.

Having described my invention, what I claim and desire to secure by Letters Patent, is:

1. A machine for use in making boxes comprising, in combination, endless work-forwarding means; fastener-setting mechanism; and a single means for causing relative progression between said mechanism and the work, comprising a feed chain equal in length to said work-forwarding means and a motion-imparting device adapted to propulsively engage said chain.

2. A machine for use in making boxes comprising, in combination, endless work-forwarding means; fastener-setting mechanism; and means for causing relative progression between said mechanism and the work, comprising a feed chain equal in length to said work-forwarding means, a plurality of members carried thereby and a motion-imparting device adapted to propulsively engage said members successively.

3. A machine for use in making boxes comprising, in combination, endless work-forwarding means including spacing means; fastener-setting mechanism; and work-feeding means comprising a series of controlling members adjustably secured to an endless chain equal in length to the work-forwarding means and a motion-imparting device adapted to propulsively engage said controlling members successively to advance the work variable distances intermittently; said machine being adapted for uninterrupted operation upon materials for a plurality of boxes.

4. A machine for use in making boxes comprising, in combination, endless work-forwarding means; fastener-setting mechanism; and means for causing relative progression between said mechanism and the work, comprising a feed chain equal in length to said work-forwarding means, a plurality of selectively spaced members adjustably carried thereby and a motion-imparting device adapted to engage each said member in turn and advance it to the same point relative to said fastener-setting mechanism.

5. A machine for use in making boxes comprising, in combination, endless work-forwarding means; fastener-setting mechanism;

and means for causing relative progression between said mechanism and the work, comprising a feed chain equal in length to said work-forwarding means; a plurality of selectively spaced members adjustably carried thereby, and a motion-imparting device adapted to engage each said member in turn and advance it a distance equal to the distance between the engaged member and its predecessor.

6. A machine for use in making boxes comprising, in combination, endless work-forwarding means; fastener-setting mechanism; and means to cause relative progression therebetween in steps of controlled length to locate fasteners at desired points on the work, comprising a feed chain equal in length to the work-forwarding mean, a series of members spaced apart thereon distances equal to the desired distances between fasteners and a motion-imparting device adapted to engage said members successively.

7. A machine for use in making boxes comprising, in combination, fastener-setting mechanism; endless work-forwarding chains; and means to advance said work-forwarding chains in steps of controlled length to locate fasteners at selected points on the work, comprising a feed chain equal in length to and having connection with said work-forwarding chains, a series of selectively spaced members secured to said feed chain and a motion-imparting feed device adapted to engage said members successively.

8. A machine for use in making boxes comprising, in combination, endless work-forwarding and spacing means; fastener-setting mechanism; and means to cause relative progression between said mechanism and the work in steps of controlled length to locate fasteners at desired points thereon, comprising a feed chain equal in length to the work-forwarding means, a series of devices carried thereby and located relative to selected fastener-receiving points on the work and a motion-imparting feed member adapted to engage each of said devices in turn and advance its corresponding fastener-receiving point to fastener-receiving position.

9. A machine for use in making boxes comprising, in combination, endless work-forwarding means; fastener-setting mechanism; and means to cause relative progression between said mechanism and the work in steps of controlled length to locate fasteners at desired points thereon, comprising a feed chain equal in length to the work-forwarding means, a series of devices carried thereby and spaced apart distances equal to the desired distances between fastener-receiving points on the work and a motion-imparting feed member adapted to engage each of said devices in turn to advance the work a distance equal to the distance between the engaged device and its predecessor; said machine being adapted to operate without interruption on materials for a plurality of boxes.

10. A machine for use in making boxes comprising, in combination, a work support; fastener-setting mechanism; conveyor chains for engaging and advancing the work; a feed chain equal in length to the conveyor chains and movable therewith; and an actuator adapted to successively engage a series of selectively spaced devices carried by said feed chain and advance each of said devices in turn to the plane of operation of said fastener-setting mechanism.

11. A machine for use in making boxes comprising, in combination, fastener-setting mechanism; a conveyor for the box parts; and means to feed said conveyor in steps of controlled length to present selected fastener-receiving points on the work to said mechanism, comprising a feed chain having connection with the conveyor and adapted to move therewith, a series of members carried by said feed chain and spaced apart distances equal to the desired distances between fasteners and a reciprocating feed pawl adapted to engage each of said members in succession and advance it to the plane of the fastener-setting mechanism.

12. A machine for use in making boxes comprising, in combination, endless work-forwarding means; fastener-setting mechanism; means to advance said work-forwarding means in steps of controlled length to locate each fastener where desired in the work, comprising a series of devices, one for each feed step in the cycle of the work-forwarding means, having connection with said means and located relative to selected fastener-receiving points on the work and a motion-imparting feed member adapted to engage each said device in succession and advance its corresponding fastener-receiving point to fastener-receiving position.

13. A machine for use in making boxes comprising, in combination, endless work-forwarding means adapted to position materials for a plurality of boxes; fastener-setting mechanism to secure said materials together; means to advance said work-forwarding means in steps of controlled length to locate each fastener where desired in the work, comprising a series of devices, one for each feed step in the cycle of the work-forwarding means, having connection with said means and located relative to selected fastener-receiving points on the work and a motion-imparting feed member adapted to engage each said device in succession and advance its corresponding fastener-receiving point to fastener-receiving position.

14. A machine for use in making boxes comprising, in combination, endless work-forwarding means; fastener-setting mechanism; and means to cause relative progression between said mechanism and the work in steps of controlled length to locate fasteners at selected points on the work, comprising a feed chain equal in length to and having a fixed ratio of movement with the work-forwarding means and carrying a pattern of feed members for a series of units of work and a motion-imparting device adapted to propulsively engage said members successively and advance the work variable distances corresponding relatively to said pattern.

15. A machine for use in making boxes comprising, in combination, endless work-forwarding means; fastener-setting mechanism; and means to cause relative progression between said mechanism and the work in steps of controlled length to locate fasteners at selected points on the work, comprising a feed chain equal in length to and having a fixed ratio of movement with the work-forwarding means and carrying a pattern of feed members for a series of units of work and a motion-imparting device adapted to propulsively engage said members successively and advance the work variable distances corresponding relatively to said pattern; said pattern operating automatically to feed a succession of series of units of work and to locate fasteners in each series according to said pattern.

16. A machine for use in making boxes comprising, in combination, fastener-setting mechanism; endless means for positioning and forwarding box parts; and means to cause relative progression between said fastener-setting mechanism and the box parts in steps of controlled length to locate fasteners on the work, comprising a feed chain equal in length to and having a fixed ratio of movement with said work-forwarding means and a motion-imparting device adapted to advance said feed chain variable distances intermittently.

17. A machine for use in making boxes comprising, in combination, work-forwarding means; fastener-setting mechanism; means for causing relative progression between said mechanism and the work, comprising a feed chain having connection with said work-forwarding means, a plurality of members carried thereby and a motion-imparting device adapted to engage said members successively; and means for automatically locking said feed chain at the termination of a feed step.

18. A machine for use in making boxes comprising, in combination, work-forwarding means; fastener-setting mechanism; means for causing relative progression between said mechanism and the work, comprising a feed chain having connection with said work-forwarding means, a plurality of members carried thereby and a motion-imparting device adapted to engage said members successively; and means for preventing overthrow of said feed chain.

19. A machine for use in making boxes comprising, in combination, work-forwarding means; fastener-setting mechanism; means for causing relative progression between said mechanism and the work, comprising a feed chain having connection with said work-forwarding means, a plurality of members carried thereby and a motion-imparting device adapted to engage said members successively; and means for preventing rebound of said feed chain.

20. In a box blank machine, a work holder comprising a plurality of endless chains; a rotatable element having connection with said chains whereby said work holder is moved forward with the movement of said rotatable element; adjustable teeth clamped at desired points to said rotatable element; and a reciprocating actuator acting successively on said teeth to move said rotatable element and said work holder intermittently.

21. In a box blank machine, a work holder comprising a plurality of endless chains; means to drive said chains intermittently, including means to vary the length of said intermittent movement, comprising a reciprocating actuator acting successively on a series of adjustable teeth carried by a rotatable element having a circumference equal to the length of said chains.

22. A machine for use in making wirebound boxes comprising, in combination, endless work-forwarding means; fastener-setting mechanism; and means for causing relative progression between said mechanism and the work, including a ratchet comprising an endless chain equal in length to said endless work-forwarding means and having adjustable teeth secured thereto.

In testimony whereof, I have signed my name to this specification.

OSCEOLA C. THOMPSON.